3,462,368
HYDROCARBYL-HYDROXYPHENYL DITHIO-
CARBAMATES AND THEIR USE AS ANTI-
OXIDANTS
John C. Wollensak and Edward F. Zaweski, Royal Oak,
Mich., assignors to Ethyl Corporation, New York, N.Y.,
a corporation of Virginia
No Drawing. Filed Feb. 27, 1967, Ser. No. 619,004
Int. Cl. C10m *1/38;* C10l *1/24;* C07c *155/08*
U.S. Cl. 252—46.7                                    10 Claims

ABSTRACT OF THE DISCLOSURE

Hydrocarbyl - hydroxyphenyl - dihydrocarbyldithiocarbamates are prepared by the reaction of dihydrocarbyl halophenols with a metal salt of a dihydrocarbylthiocarbylthiocarbamate. For example, the reaction of 2,6-di-tert-butyl-4-bromophenol with the sodium salt of dimethyldithiocarbamate yields 3,5-di-tert - butyl - 4 - hydroxyphenyl dimethyldithocarbamate. The compounds are useful as antioxidants. Effectiveness is enhanced by dihydrocarbyl thiodialkanoates and organic phosphites or phosphonates.

BACKGROUND

Many organic materials undergo oxidative or thermal dgradation on aging or exposure to high temperatures. The problem is particularly acute in the plastic, rubber and petroleum industries. Plastics not only must possess long life, but they must also be able to withstand the temperature employed in fabricating them into commercial forms. The problem is especially acute with Ziegler type poly-alpha-olefins derived from alpha-olefins containing 3 or more carbon atoms. These not only require higher fabrication temperatures due to their higher melting point, but contain many tertiary carbon atoms which are very readily attacked by oxygen.

Another area of great interest is the stabilization of lubricating oils, both hydrocarbon-derived and synthetic, against degradation at the increased temperatures being encountered in many modern applications.

SUMMARY

This invention relates to the stabilization of organic materials with hydrocarbyl-hydroxyphenyl dihydrocarbyl-dithiocarbamates and to a process for making these stabilizers by the reaction of a hydrocarbyl halophenol with a metal salt of a dihydrocarbyl dithiocarbamate.

An object of this invention is to provide organic compositions of increased stability. A further object is to provide an additive which, when incorporated into organic compositions, enhances their stability. A still further object is to provide a process for making these new stabilizers.

These and other objects are accomplished by providing an antioxidant compound having the formula:

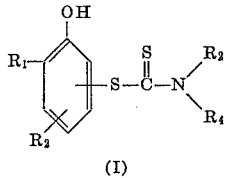

(I)

wherein $R_1$ is selected from the group consisting of alpha-branched alkyl radicals containing 3–20 carbon atoms, alpha-branched aralkyl radicals containing 8–20 carbon atoms, and cycloalkyl radicals containing 6–20 carbon atoms, $R_2$ is selected from the group consisting of hydrogen, alkyl radicals containing 1–20 carbon atoms, aralkyl radicals containing 7–20 carbon atoms, and cycloalkyl radicals containing 6–20 carbon atoms, $R_3$ and $R_4$ are independently selected from the group consisting of hydrogen, alkyl radicals containing 1–16 carbon atoms, aryl radicals containing 6–20 carbon atoms, and radicals having the formula:

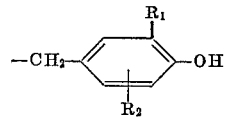

wherein $R_1$ and $R_2$ are independently selected from the same groups previously defined for these radicals.

Embodiments of these new antioxidants are represented by the following examples:

3-methyl-5-tert-butyl-4-hydroxyphenyl diethyl dithiocarbamate
5-sec-butyl-4-hydoxy-o-tolyl dimethyl dithiocarbamate
3,5-di-sec-eicosyl-4-hydroxyphenyl dicetyl dithiocarbamate
3,5-di(α-mehylbenzyl)-4-hydroxyphenyl diphenyl dithiocarbamate
5(α-methylbenzyl)-4-hydroxy-meta-tolyl-(p-tert-octylphenyl)hexyl dithiocarbamate
3,5-dicyclohexyl-4-hydroxyphenyl dodecyl (3,5-dicyclohexyl-4-hydroxybenzyl)dithiocarbamate
5(α,α-dimethylbenzyl)-4-hydroxy-o-tolyl-di(3-tert-butyl-6-methyl-4-hydroxybenzyl)dithiocarbamate
3-tert-butyl-4-hydroxyphenyl-dimethyldithiocarbamate
3-sec-butyl-4-hydroxyphenyl-di-n-butyldithiocarbamate
3-tert-butyl-5-methyl-2-hydroxyphenyl-dimethyldithiocarbamate
3-tert-butyl-2-hydroxyphenyl-di-n-butyldithiocarbamate
3,5-di(α-methylbenzyl)-2-hydroxyphenyl-di-n-octyl-dithiocarbamate
3,5-di(α,α-dimethylbenzyl)-2-hydroxyphenyl - n - butyl-(3,5-di-tert-butyl-4-hydroxybenzyl)-dithiocarbamate In a preferred embodiment, $R_2$ in Formula I is bonded to the carbon atom of the phenyl nucleus at the position ortho to the phenolic hydroxyl radical and the dithiocarbmate radical is bonded to the carbon atom of the phenyl nucleus at the position para to the phenolic hydroxyl radical. This preferred embodiment has the formula:

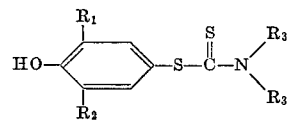

(II)

in which $R_1$, $R_2$, $R_3$ and $R_4$ are chosen from the same groups previously defined for these radicals. In a more preferred embodiment, both $R_1$ and $R_2$ in Formula II are alpha-branched radicals—that is, secondary or tertiary radicals. Some examples of this preferred embodiment are:

3,5-di-sec-butyl-4-hydroxyphenyl dimethyl-dithiocarbamate
3,5-diisopropyl-4-hydroxyphenyl di(3,5-diisopropyl-4-hydroxybenzyl)dithiocarbamate
3-tert-butyl-5-tert-octyl-4-hydroxyphenyl dodecyl(3,5-di-tert-butyl-4-hydroxybenzyl)dithiocarbamate
3,5-di-sec-eicosyl-4-hydroxyphenyl methylphenyl-dithiocarbamate
3,5-di-tert-butyl-4-hydroxyphenyl diphenyl-dithiocarbamate
3,5-dicyclohexyl-4-hydroxyphenyl di(3,5-di-tert-butyl-4-hydroxybenzyl)dithiocarbamate
3-tert-butyl-5-(α-methylbenzyl)-4-hydroxyphenyl dihexyldithiocarbamate
3-tert-butyl-5-isopropyl-4-hydroxyphenyl dicetyl dithiocarbamate In a most preferred embodiment, both $R_1$ and $R_2$ in Formula II are the tert-butyl radical, and $R_3$ and $R_4$ are alkyl groups of from 1 to about 16 carbon atoms. Examples of these compounds are:

3,5-di-tert-butyl-4-hydroxyphenyl dimethyldithiocarbamate
3,5-di-tert-butyl-4-hydroxyphenyl-di-n-butyldithiocarbamate
3,5-di-tert-butyl-4-hydroxyphenyl dihexyl dithiocarbamate
3,5-di-tert-butyl-4-hydroxyphenyl didodecyl dithiocarbamate
3,5-di-tert-butyl-4-hydroxyphenyl dicetyl dithiocarbamate
3,5-di-tert-butyl-4-hydroxyphenyl methylcetyl dithiocarbamate
3,5-di-tert-butyl-4-hydroxyphenyl hexyldodecyl dithiocarbamate The antioxidants of this invention are made by reacting a compound having the formula:

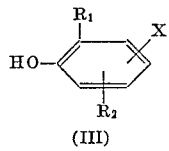

(III)

wherein $R_1$ is selected from the group consisting of alpha-branched alkyl radicals containing 3–20 carbon atoms, alpha-branched aralkyl radicals containing 8–20 carbon atoms, and cycloalkyl radicals containing 6–20 carbon atoms, $R_2$ is selected from the group consisting of hydrogen, alkyl radicals containing 1–20 carbon atoms, aralkyl radicals containing 7–20 carbon atoms, and cycloalkyl radicals containing 6–20 carbon atoms, and X is halogen having an atomic number from 17 to 53; with a compound having the formula:

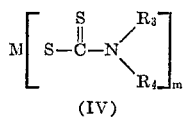

(IV)

wherein M is a metal selected from the group consisting of alkali metals and alkaline earth metals, $m$ is the valence of M, and $R_3$ and $R_4$ are independently selected from the group consisting of hydrogen, alkyl radicals containing from 1–16 carbon atoms, aryl radicals containing from 6–20 carbon atoms; and radicals having the formula:

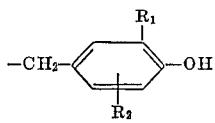

wherein $R_1$ and $R_2$ are independently selected from the group previously defined for these radicals.

The reactants are chosen with a view toward the product desired. It is quite surprising that the reaction proceeds because halogen bonded directly to benzene rings is known to be extremely resistant to replacement. Electron donor groups on the benzene ring such as the hydroxyl radical increase this resistance. Chlorobenzene reacts with aqueous sodium hydroxide only at 300°, and even then requires the presence of a copper salt catalyst (Dow process for manufacturing phenol). In this respect, halogens bonded to benzene rings differ sharply with halogens bonded to benzyl radicals. The latter react readily with basic metal salts or hydroxides.

Depending upon the product desired, suitable halophenol reactants include:

o-tert-butyl-p-bromophenol
2,6-di-tert-butyl-p-chlorophenol
2,4-di-tert-butyl-p-chlorophenol
2,6-di-tert-butyl-p-bromophenol
2,4-di-tert-butyl-6-bromophenol
2,6-di-tert-butyl-p-iodophenol
2-tert-butyl-4-methyl-6-chlorophenol
6-tert-butyl-p-bromo-meta-cresol
2-(α-methylbenzyl)-4-sec-nonyl-6-iodophenol
2,6-dicyclohexyl-p-iodophenol
6-(α,α-dimethylbenzyl)-p-bromo-o-cresol
2,5-di-tert-butyl-p-chlorophenol
2,6-di-sec-eicosyl-p-bromophenol Suitable metal dithiocarbamates include:

sodium dimethyl dithiocarbamate
potassium diphenyl dithiocarbamate
calcium dimethyl dithiocarbamate
magnesium di(3,5-di-tert-butyl-4-hydroxybenzyl) dithiocarbamate
lithium dicetyl dithiocarbamate
strontium diphenyl dithiocarbamate
potassium dihexyl dithiocarbamate
cesium di(2-methyl-5-tert-butyl-4-hydroxybenzyl)dithiocarbamate
barium dodecyl(3,5-dicyclohexyl-4-hydroxybenzyl)dithiocarbamate The more preferred salts are the alkali metal and alkaline earth metal salts. The most preferred salts are the sodium salts.

Methods of making the starting materials are well known. The phenolic reactants are easily made by merely alkylating a parahalophenol or by first alkylating the phenol using well-known methods, such as that taught by Ecke et al. in U.S. Patent 2,831,898, followed by halogenating the alkylated phenol to obtain the desired halophenol. In the foregoing, the term "alkylated" is also understood to include cycloalkylate or aralkylate. Metal salts of dithiocarbamates are also well known. A method for making metal salts of dithiocarbamates in which the nitrogen atom is substituted with disubstituted hydroxybenzyl groups is shown in British Patent 1,024,651. Another method is shown by M. Delepine, Compt. Rend. 144, 1225 (1907).

The reaction can be conducted employing a solvent or without any solvent. Preferably, a solvent is used. Any solvent can be used that is relatively inert to the reactants under the reaction conditions. Some examples are alcohols such as methanol, ethanol and isopropanol; ketones such as acetone and methylethyl ketone; ethers such as diethylether, dimethylether of ethyleneglycol, dimethylether of diethyleneglycol and diethylether of ethyleneglycol; ether alcohols such as monomethylether of ethyleneglycol, monoethylether of ethyleneglycol, monomethylether of diethyleneglycol, and the like.

Although either order of addition may be used, it is preferred to add the halophenol reactant to the metal dithiocarbamate. If the metal dithiocarbamate is water soluble it is preferred that the halophenol be added to an aqueous solution of the metal dithiocarbamate. When the above-described solvents are employed the halophenol may be readily added as a solution.

The reaction temperature should be high enough to promote the reaction at a reasonable rate, but not so high as to cause decomposition. A useful range is from about 30–200° C. A more useful range is from about 50–150° C., which range generally permits temperature control by merely allowing the solvent to reflux.

The reaction can be carried out without an inert atmosphere, but the use of an inert atmosphere above the reaction mixture is generally preferred since it results in a purer product and reduces fire hazards.

The reaction should be carried out for a time sufficient to form a substantial amount of product. This is usually accomplished in from one hour to several days. A more useful time range is from about 1 to 24 hours, and a most useful range is from 4 to 16 hours.

The reaction need not be conducted under pressure unless pressure is required in order to attain the desired reaction temperatures. This is sometimes necessitated due to the vapor pressure of the solvent at the desired temperature. In this case, the reaction is merely conducted in a sealed pressure reaction vessel and allowed to seek its own pressure.

The halophenols and metal dithiocarbamates can be employed in a wide range of molar ratios such as from about 0.7 to 2.0 moles of halophenol per mole of metal dithiocarbamate. This assumes that the metal is monovalent. In the case of divalent metal dithiocarbamates the molar quantity of dithiocarbamate can be cut in half. In other words, the molar portion of metal dithiocarbamate employed refers to the moles of the dithiocarbamate portion of the molecule, and if polyvalent metals are used there will generally be more than one mole equivalent of the dithiocarbamate radical. Generally, it is preferred to use about equal mole quantities and hence a most preferred mole ratio is from 0.8 to 1.2 moles of halophenol per mole of dithiocarbamate.

The following examples serve to illustrate the manner in which the antioxidants are prepared but not to limit in any respect the scope of the invention claimed. All parts are parts by weight unless otherwise noted.

EXAMPLE 1

To a reaction vessel equipped with a stirrer, condenser, thermometer and provided with a nitrogen atmosphere was added 28.5 parts of 2,6-di-tert-butyl-p-bromophenol and 160 parts of methanol. While stirring at 30° C., a solution of 13.2 parts of sodium dimethyldithiocarbamate in 20 parts of water was added. The mixture was refluxed for 9 hours. On cooling, a solid product precipitated which, after recrystallization from hexane, had a melting point of 172–3° C. Analysis showed the material to contain 4.33 percent sulfur, 19.6 percent nitrogen, 62.8 percent carbon, and 8.73 percent hydrogen, which served to identify the product as 3,5-di-tert-butyl-4-hydroxyphenyl dimethyldithiocarbamate.

EXAMPLE 2

To a reaction vessel as described in Example 1 is added a solution of 179 parts of sodium dimethyldithiocarbamate dihydrate in 225 parts of water. The solution is stirred and heated to reflux and then, over a period of 4 hours, a second solution of 243 parts of 4-bromo-6-tert-butyl-meta-cresol in 500 parts of isopropanol is added. Following this, the mixture is refluxed for an additional 8 hours and then cooled to room temperature. Water is added, causing the product, 4-hydroxy-5-tert-butyl-o-tolyl-di-methyldithiocarbamate, to precipitate.

In the above example other halophenols can be employed to give the corresponding dithiocarbamate. For example, 2 - methyl - 6 - (α-methylbenzyl)-p-chlorophenol yields 3-methyl-5-(α-methylbenzyl)-4-hydroxyphenyl dimethyldithiocarbamate. Likewise, 4-iodo-6-(α-methylbenzyl)-meta-cresol results in 4-hydroxy-5-(α-methylbenzyl)-o-tolyl dimethyldithiocarbamate. In like manner, 2,6-dicyclohexyl-p-bromophenol gives 3,5-dicyclohexyl-4-hydroxyphenyl dithiocarbamate. Also, 2-tert-butyl-p-bromophenol results in 2-tert-butyl-4-hydroxyphenyl dimethyldithiocarbamate. Likewise, 2,4-tert-amyl-6 - bromophenol forms 3,5-di-tert-butyl-2-hydroxyphenyl dimethyldithiocarbamate.

EXAMPLE 3

To a reaction vessel as used in Example 1 is added 285 parts of 2,6-di-tert-butyl-p-bromophenol and 500 parts of the dimethylether of diethyleneglycol. There is then added 220 parts of potassium di(3,5-di-tert-butyl-4-hydroxybenzyl)dithiocarbamate. The mixture is stirred at 100° C. for 8 hours. Following this, it is cooled and 200 parts of water added, causing the product, 3,5-di-tert-butyl-4-hydroxyphenyl di(3,5-di-tert-butyl-4-hydroxybenzyl)dithiocarbamate, to precipitate.

In the above reaction other phenols can be employed with good results. For example, 4-iodo-6-tert-butyl-metacresol yields 4-hydroxy-5-tert-butyl-o-tolyl di(3,5-di-tert-butyl-4-hydroxybenzyl)dithiocarbamate. Likewise, 2,6-diisopropyl-p-bromophenol results in 3,5--diisopropyl-4-hydroxyphenyl di(3,5-di-tert-butyl-4-hydroxybenzyl)dithiobamate. Similarly, 2,6-dicyclohexyl-p-chlorophenol results in 3,5-dicyclohexyl-4-hydroxyphenyl di(3,5-di-tert-butyl-4-hydroxybenzyl)dithiocarbamate.

EXAMPLE 4

To a pressure reaction vessel equipped with stirrer, thermometer and heating means is added 428 parts of 2,6-di(α-methylbenzyl)-p-iodophenol and 1000 parts of methylethyl ketone. There is then added 565 parts of sodium dicetyldithiocarbamate. The pressure vessel is sealed and, while stirring, the mixture is heated to 150° C. and maintained at this temperature for 4 hours. On cooling, the product, 3,5-di(α-methylbenzyl)-4-hydroxyphenyl dicetyldithiocarbamate, precipitates.

In the above example other metal salts of dicetyldithiocarbamic acid can be used such as the potassium, calcium, barium, lithium, cesium, magnesium or strontium salt.

EXAMPLE 5

To a reaction vessel as described in Example 1 is added 240.5 parts of 2,6-di-tert-butyl-p-chlorophenol dissolved in 1000 parts of the monoethylether of ethyleneglycol. There is then added 347 parts of sodium methyl(3,5-di-tert-butyl-4-hydroxybenzyl)dithiocarbamate and the mixture refluxed for 24 hours. After this, it is cooled to room temperature and 500 parts of water added, causing the product, 3,5-di-tert-butyl-4-hydroxyphenyl methyl(3,5-di-tert-butyl-4-hydroxybenzyl)dithiocarbamate to precipitate.

In the above example other dithiocarbamates can be used. For example, potassium cetyl(3,5-dicyclohexyl-4-hydroxybenzyl)dithiocarbamate yields 3,5-di-tert-butyl-4-hydroxyphenyl cetyl(3,5 - dicyclohexyl-4-hydroxybenzyl)dithiocarbamate yields 3,5 - di-tert-butyl-4-hydroxyphenyl cetyl(3,5 - dicyclohexyl-4-hydroxybenzyl)dithiocarbamate. Likewise, barium hexyl(2-methyl-5-tert-butyl-4-hydroxybenzyl)dithiocarbamate yields 3,5-di-tert-butyl-4-hydroxyphenyl hexyl(2 - methyl - 5-tert-butyl-4-hydroxybenzyl)dithiocarbamate.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some example are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR–N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rape seed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polyethylene and polypropylene (both high pressure and so-called Ziegler type), polybutene, and polybutadiene (both cis and trans).

The amount of stabilizer used in the organic compositions of this invention is not critical as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 6

A rubber stock is prepared containing the following components.

| Component: | Parts |
| --- | --- |
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of 3-methyl-5-tert-butyl-4-hydroxyphenyl diethyldithiocarbamate and, following this, individual samples are cured for 20, 30, 45 and 60 minutes, respectively, at 274° C. After cure, all of these samples remain white in color and possess excellent tensile strength. Furthermore, they are resistant to degradation caused by oxygen or ozone on aging.

EXAMPLE 7

A synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of 5-sec-butyl-4-hydroxy-o-tolyl dimethyldithiocarbamate. This composition is then cured for 60 minutes employing 45 p.s.i.g. of steam pressure. The resulting synthetic rubber possesses resistance to oxygen and ozone induced degradation.

EXAMPLE 8

A butadiene acrylonitrile copolymer is prepared from 68 percent 1,3-butadiene and 32 percent acrylonitrile. Two percent, based on the weight of the copolymer, of 3,5-di-sec-eicosyl-4-hydroxyphenyl dicetyldithiocarbamate is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 9

Three percent of 3,5-di($\alpha$-methylbenzyl)-4-hydroxyphenyl diphenyldithiocarbamate as an emulsion in sodium oleate is added to a rubber-like copolymer of 1,3-butadiene and styrene containing 25 percent styrene. The resulting synthetic elastomer possesses enhanced stability.

EXAMPLE 10

To a master batch of GR–N synthetic rubber containing 100 parts of GR–N rubber, 5 parts of zinc stearate, 50 parts of carbon black, 5 parts of road tar, 2 parts of sulfur and 2 parts of mercaptobenzothiazole is added 5 percent, based on weight, of 5-($\alpha$-methylbenzyl)-4-hydroxy - meta-tolyl-(p-tert-octylphenyl)hexyl dithiocarbamate. After curing, a synthetic rubber is obtained of improved oxidative stability.

EXAMPLE 11

To a master batch of polyethylene having an average molecular weight of 1,000,000, a tensile strength of 6,700 p.s.i., a Shore D hardness of 74, and a softening temperature under low load of 150° C., is added 5 percent of 3,5-dicyclohexyl-4-hydroxy - phenyl dodecyl(3,5-dicyclohexyl-4-hydroxybenzyl)dithiocarbamate. The resulting polyethylene possesses stability against oxidative degradation and shows no tendency to yellow after extensive aging.

EXAMPLE 12

A linear polyethylene having a high degree of crystallinity (93 percent), and less than one branched chain per 100 carbon atoms, a density of about 0.96 gram per ml. and which has about 1.5 double bonds per 100 carbon atoms, is mixed with 0.005 weight percent of 5($\alpha,\alpha$-dimethylbenzyl)-4 - hydroxy - o - tolyl-di(3-tert-butyl-6-methyl-4-hydroxybenzyl)dithiocarbamate. The resulting polyethylene is found to possess stability against oxidative degradation.

EXAMPLE 13

To 100 parts of an ethylenepropylene terpolymer with cyclopentadiene is added 3 parts of 3,5-di-sec-butyl-4-hydroxyphenyl dimethlydithiocarbamate, resulting in an ethylenepropylene terpolymer of enhanced stability.

EXAMPLE 14

To 100 parts of an ethylenepropylene rubber is added 2 parts of 3,5-diisopropyl-4-hydroxyphenyl di(3,5-diisopropyl-4-hydroxybenzyl)dithiocarbamate, resulting in an EPR rubber stock of improved stability.

EXAMPLE 15

After the polymerization of polypropylene in a hexane solvent employing a Ziegler catalyst, the catalyst is neutralized with water and 3-tert-butyl-5-tert-octyl - 4 - hydroxyphenyl dodecyl(3,5-di-tert-butyl-4 - hydroxybenzyl) dithiocarbamate is added to the mixture in quantities such that, after evaporation of the solvent, a Ziegler polypropylene is obtained containing 2 percent of 3-tert-butyl-5-tert-octyl-4-hydroxyphenyl dodecyl(3,5-di-tert-butyl - 4-hydroxybenzyl)dithiocarbamate. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 16

To 1,000 parts of a crystalline polypropylene prepared using a Ziegler type catalyst is added 1 weight percent of 3,5-di-sec-eicosyl - 4 - hydroxyphenyl methylphenyldithiocarbamate. The resulting mixture is melted and stirred, resulting in a molten polypropylene composition possessing excellent resistance to thermal degradation.

EXAMPLE 17

To 1,000 parts of poly-cis-butadiene dissolved in benzene is added 0.15 weight percent of 3,5-di-tert-butyl-4-hydroxyphenyl diphenyldithiocarbamate. The resultant poly-cis-butadiene solution is transferred slowly into boiling water which causes the water and benzene to co-distill, leaving a stabilized poly-cis-butadiene.

EXAMPLE 18

To 1,000 parts of a crystalline polypropylene made using a Ziegler catalyst is added 1 weight percent of 3,5-di-tert - butyl - 4 - hydroxyphenyl diphenyldithiocarbamate. The mixture is melted and immediately stirred, giving a highly stable polypropylene.

EXAMPLE 19

To 1,000 parts of solvent-refined mid-continent neutral lubricating oil containing 0.05 percent zinc-dilaurylthiophosphate, 4 percent of a poly laurylmethacrylate VI improver and 0.05 percent of an over-based calcium sulfonate and 2 percent of a dispersant formed by reacting an alkenyl succinic anhydride wherein the alkenyl chain is a polybutene with a molecular weight of about 1,000 with tetraethylene pentamine is added 0.05 percent of 3,5-dicyclohexyl-4-hydroxyphenyl di(3,5-di-tert-butyl-4-hydroxybenzyl) dithiocarbamate. The resulting oil is resistant to thermal and oxidant deterioration.

EXAMPLE 20

To 1,000 parts of an acrylonitrile-styrene-butadiene resin (ABS resin) is added 10 parts of carbon black and 5 parts of 3-tert-butyl-5-($\alpha$-methylbenzyl) - 4 - hydroxyphenyl dihexyldithiocarbamate. The mixture is blended in a Banbury mixer, resulting in a highly stable ABS resin.

EXAMPLE 21

To 1,000 parts of a gasoline containing 26.6 percent aromatics, 20.8 percent olefins, 52.6 percent saturates and having an API gravity of 62.1 is added 10 parts of 3-tert - butyl - 5 - isopropyl - 4 - hydroxy dicetyldithiocarbamate. The resulting gasoline is stable.

EXAMPLE 22

To 10,000 parts of gasoline containing 8.6 percent aromatics, 7.9 percent olefins, 83.5 percent saturates and having an API gravity of 68.5 is added 200 parts of 3,5 - di - tert - butyl - 4 - hydroxyphenyl dimethyldithiocarbamate. The resulting gasoline is stable against oxidative degradation.

EXAMPLE 23

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of 3,5-di-tert-butyl-4-hydroxyphenyl di-n-butyldithiocarbamate. The resulting gasoline containing a manganese antiknock was resistant to oxidative degradation.

EXAMPLE 24

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of 3,5-di-tert-butyl - 4 - hydroxyphenyl didodecyldithiocarbamate. The resulting gasoline containing a lead antiknock and halogen scavenger is resistant to oxidative degradation.

EXAMPLE 25

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris($\beta$ - chloro - isopropyl) thionophosphate is added 50 parts of 3,5 - di - tert - butyl-4 - hydroxyphenyl dicetyldithiocarbamate. The resulting gasoline is resistant to degradation.

EXAMPLE 26

An antiknock fluid composition is prepared by mixing together 61.5 parts of tetraethyllead, 17.9 parts of ethylenedibromide, 18.8 parts of ethylenedichloride and 1.3 parts of 3 - methyl - 5 - tert - butyl - 4 - hydroxyphenyl diethyldithiocarbamate, resulting in a stable antiknock fluid composition.

EXAMPLE 27

To 1,000 parts of a commercial diesel fuel having a cetane number of 42 is added 5 parts of amyl nitrate and 4 parts of 3,5-di - tert - butyl - 4 - hydroxyphenyl methylcetyldithiocarbamate, resulting in a diesel fuel of high resistance to oxidative deterioration which does not form gum or sludge on storage.

EXAMPLE 28

To 1,000 parts of a solvent-refined neutral oil (95 viscosity index and 200 SUS at 100° F.) containing 6 percent of a commercial methacrylate type VI improver is added 5 percent of 3,5-dicyclohexyl - 4 - hydroxyphenyl di(3,5 - di - tert - butyl - 4 - hydroxybenzyl) dithiocarbamate, resulting in a stable lubricating oil.

EXAMPLE 29

To a solvent-refined crankcase lubricating oil having a viscosity index of 95 and a SAE viscosity of 10 is added 0.1 percent of 3 - tert - butyl - 5 - tert - octyl - 4-hydroxyphenyl dodecyl(3,5-di-tert - butyl - 4 - hydroxybenzyl)dithiocarbamate. The resulting oil was stable against oxidative degradation.

EXAMPLE 30

To 100,000 parts of petroleum hydrocarbon oil having a gravity of 30.3° API to 60° F., viscosity of 178.8 SUS at 100° F., a viscosity index of 154.2, and containing 1,000 parts of the reaction product of an alkenyl succinic anhydride where the alkenyl group has a molecular weight of 2,000, with a polyethylene amine, is added 200 parts of 3,5-di-tert-butyl - 4 - hydroxyphenyl didodecyldithiocarbamate. The resulting lubricating oil possesses excellent dispersancy and is resistant to oxidative degradation.

EXAMPLE 31

To 100,000 parts of a commercially available pentaerythritol ester having a viscosity of 100° F. of 22.4 centistokes and known under the tradename of "Hercoflex 600" is added 400 parts of 3,5-di-tert-butyl-4-hydroxyphenyl dimethyldithiocarbamate. The resulting synthetic lubricating oil possesses improved resistance against oxidative deterioration.

EXAMPLE 32

To 100,000 parts of dioctyl sebacate having a viscosity at 210° F., of 36.7 SUS, a viscosity index of 159, and a molecular weight of 427 is added 250 parts of 3,5-di-tert-butyl-4-hydroxyphenyl dodecyl(3,5-di-tert-butyl - 4 - hydroxybenzyl)dithiocarbamate, resulting in a synthetic diester lubricating oil having improved resistance to oxidative degradation.

EXAMPLE 33

To 1,000 parts of a commercial coconut oil is added 5 parts of 3,5-di-sec-eicosyl-4-hydroxyphenyl methylphenyldithiocarbamate, resulting in a vegetable oil with good aging characteristics.

EXAMPLE 34

To 100,000 parts of lard is added 100 parts of 3,5-di-tert-butyl-4-hydroxyphenyl diphenyldithiocarbamate, resulting in a lard having resistance to rancidity.

The stabilizing additives of this invention are eminently useful as stabilizers in polyolefins such as polyethylene, polypropylene, and the like. In this use they function as antioxidants, antiozonants and also as thermal stabilizers. They are extremely long lasting and highly resistant to the formation of color.

Tests were conducted demonstrating the effectiveness of the antioxidants in lubricating oil. One of these tests was the Polyveriform Test. In this test, 100 ml. samples were prepared from a mid-continent solvent-refined neutral lubricating oil containing 0.1 weight percent ferric oxide in the form of ferric hexoate and 0.05 weight percent lead bromide. A clean, weighed copper-lead bearing was placed in each oil sample. One sample was subjected to the test unstabilized and the others were stabilized with 3,5-di-tert-butyl - 4 - hydroxyphenyl dimethyldithiocarbamate. The test was run at 300° F. Air was bubbled through the samples at a rate of 48 liters per hour. After 48 hours, the test was discontinued and the bearing weight loss, acid number and viscosity increase of the oil samples determined. An increase in bearing weight loss, acid number or viscosity indicates oxidative or thermal deterioration. The following table shows the results obtained.

| Additive | Conc. | Bearing wt. loss (mg.) | Acid No. increase | Percent viscosity increase |
|---|---|---|---|---|
| None | | 656 | 16.1 | 207 |
| 3,5-di-tert-butyl-4-hydroxyphenyl dimethyldithiocarbamate | 0.5 | 9 | 0.1 | 10 |
| Do | 0.25 | 9 | 0.4 | 10 |

The above results show the stabilizers to be extremely effective. The stabilized oil showed very little increase in acid number or viscosity and hardly any bearing weight loss, whereas the unstabilized oil degraded badly and caused a catastrophic bearing weight loss.

The effectiveness of the present stabilizers can be enhanced still further by employing synergistic mixtures of the stabilizers of this invention. The preferred synergists are selected from the group consisting of compounds having the formula:

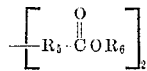

(V)

wherein $R_5$ is a divalent hydrocarbon radical containing from 1 to about 6 carbon atoms and $R_6$ is an alkyl radical containing from 6 to about 20 carbon atoms, and compounds having the formula:

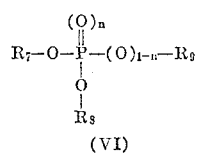

(VI)

wherein $n$ is an integer from 0–1 and $R_7$ and $R_8$ are independently selected from the group consisting of alkyl radicals containing from 1 to about 20 carbon atoms, aralkyl radicals containing from 7 to about 20 carbon atoms, aryl radicals containing from 6 to about 20 carbon atoms and alkaryl radicals containing from 7 to about 20 carbon atoms and $R_9$ is selected from the group consisting of hydrogen and the same group from which $R_7$ and $R_8$ are selected. Some examples of synergists are dilaurylthiodipropionate, diamylthiodiacetate, β,β' - thiobis(cetylbutyrate), diethicosylthiodiheptoate, diphenylthiodipropionate, dibenzythiodibutyrate, didecylthiodipropionate, dihexylthiodiacetate, di-butylhydrogen phosphonate, trinoylphosphite, triphenylphosphite, trimethylphosphite, tri-n-butylphosphite, tributylphosphonate, tri-p-nonylphenylphosphite, di-p-nonylphenyl hydrogen phosphonate, tricresylphosphite, trinonylphosphonate, tricetylphosphite, tricyclohexylphosphite, and the like. Preferred synergists are represented by Formula V wherein $R_5$ contains from 1–3 carbon atoms and $R_6$ is an alkyl radical containing from 10 to about 18 carbon atoms. The most preferred synergists are dilaurylthiodipropionate and distearylthiodipropionate.

The ratio of synergist to stabilizing compound should be adjusted to give the desired protection at the least cost. Mixtures containing from 1 percent synergist and 99 percent stabilizer to those containing 9 percent synergist and 1 percent stabilizer can be employed. A more useful range is from 10–90 percent. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed.

The following table lists some useful synergistic combinations.

(1)

| | Percent |
|---|---|
| Dilaurylthiodipropionate | 66 |
| 3,5-di-tert-butyl-4-hydroxyphenyl dimethyldithiocarbamate | 34 |

(2)

| | |
|---|---|
| Dicetylthiodipropionate | 90 |
| 3 - methyl - 5 - tert - butyl - 4 - hydroxyphenyl diethyldithiocarbamate | 10 |

(3)

| | |
|---|---|
| Diamylthiodiacetate | 10 |
| 3,5-dicyclohexyl-4-hydroxyphenyl dodecyl(3,5-dicyclohexyl-4-hydroxybenzyl)dithiocarbamate | 90 |

(4)

| | |
|---|---|
| Dioctadecylthiodipropionate | 50 |
| 3,5-di-sec-butyl-4-hydroxyphenyl dimethyldithiocarbamate | 50 |

(5)

| | |
|---|---|
| Trinonylphosphite | 50 |
| 3,5-dicyclohexyl-4-hydroxyphenyl di(3,5-di-tert-butyl-4-hydroxybenzyl)dithiocarbamate | 50 |

(6)

| | |
|---|---|
| Tri-p-nonylphenylphosphite | 10 |
| 3,5-di-tert-butyl-4-hydroxyphenyl didodecyldithiocarbamate | 90 |

(7)

| | |
|---|---|
| Tributylphosphonate | 90 |
| 3,-5-di-tert-butyl-4-hydroxyphenyl di-n-butyldithiocarbamate | 10 |

The above synergistic combinations are useful in any of the previously-described organic materials. The organic compositions are prepared as shown in the previous examples by merely adding the synergistic combination in place of the antioxidant compound.

We claim:
1. Organic material normally susceptible to oxidative deterioration containing a stabilizing amount of a compound having the formula:

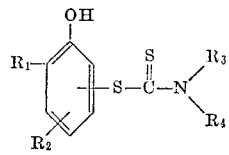

wherein $R_1$ is selected from the group consisting of alpha-branched alkyl radicals containing 3–20 carbon atoms, alpha-branched aralkyl radicals containing 8–20 carbon atoms, and cycloalkyl radicals containing 6–20 carbon atoms, $R_2$ is selected from the group consisting of hydrogen, alkyl radicals containing 1–20 carbon atoms, aralkyl radicals containing 7–20 carbon atoms, and cycloalkyl radicals containing 6–20 carbon atoms, $R_3$ and $R_4$ are independently selected from the group consisting of hydrogen, alkyl radicals containing 1–16 carbon atoms, aryl radicals containing 6–20 carbon atoms, and radicals having the formula:

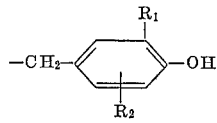

wherein $R_1$ and $R_2$ are independently selected from the same groups previously defined for these radicals.

2. The composition of claim 1 wherein said organic material is a lubricating oil.

3. The composition of claim 2 wherein said compound is 3,5-di-tert-butyl-4-hydroxyphenyl dimethyldithiocarbamate.

4. The composition of claim 2 wherein said compound is 2-methyl-5-tert-butyl-4-hydroxyphenyl dimethyldithiocarbamate.

5. The composition of claim 1 wherein said organic material is a polymer of an alpha-olefin.

6. The composition of claim 5 wherein said polymer of an alpha-olefin is polypropylene.

7. The composition of claim 6 wherein said compound is 3,5-di-tert-butyl-4-hydroxyphenyl dimethyldithiocarbamate.

8. The composition of claim 1 containing a synergistic amount of a synergist selected from the group consisting of compounds having the formula:

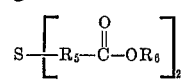

wherein $R_5$ is a divalent hydrocarbon radical containing from 1 to about 6 carbon atoms and $R_6$ is an alkyl radical containing from 6 to about 20 carbon atoms; and compounds having the formula:

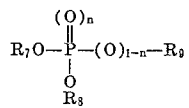

wherein $n$ is an integer from 0 to 1, $R_7$ and $R_8$ are independently selected from the group consisting of alkyl radicals containing from 1 to about 20 carbon atoms, aryl radicals containing from 6 to about 20 carbon atoms, and aralkyl radicals containing from 7 to about 20 carbon atoms, and $R_9$ is selected from the group consisting of hydrogen and the same group from which $R_7$ and $R_8$ are selected.

9. The composition of claim 8 wherein said organic material is polypropylene.

10. The composition of claim 9 wherein said compound is 3,5-di-tert-butyl-4-hydroxyphenyl dimethyldithiocarbamate and said synergist is dilaurylthiodipropionate.

References Cited

UNITED STATES PATENTS

| | | | |
|---|---|---|---|
| 2,941,879 | 6/1960 | Goodhue | 71—2.7 |
| 3,117,947 | 1/1964 | Turner | 260—455 X |
| 3,260,758 | 7/1966 | O'Shea et al. | 260—455 X |
| 3,280,070 | 10/1966 | Battista et al. | 260—45.85 |
| 3,291,842 | 12/1966 | O'Shea et al. | 260—455 X |
| 3,355,422 | 11/1967 | Brindell | 260—45.85 |

DANIEL E. WYMAN, Primary Examiner

W. CANNON, Assistant Examiner

U.S. Cl. X.R.

44—75; 252—46.6, 47.5, 402; 260—45.9

UNITED STATES PATENT OFFICE
CERTIFICATE OF CORRECTION

Patent No. 3,462,368　　　　Dated August 19, 1969

Inventor(s) John C. Wollensak and Edward F. Zaweski

It is certified that error appears in the above-identified patent and that said Letters Patent are hereby corrected as shown below:

Column 1, lines 16-17, "dihydrocarbylthiocarbylthiocarbamate" should read -- dihydrocarbylthiocarbamate --; line 20, "dimethyl-dithocarbamate" should read -- dimethyldithiocarbamate --; lines 59-63, that portion of the formula reading

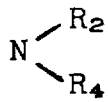　　　should read　　　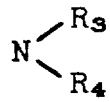

Column 2, lines 46-48, that portion of the formula reading

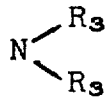　　　should read　　　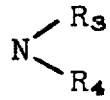

Column 5, line 61, "2-tert-butyl" should read -- 3-tert-butyl --.
Column 6, lines 38-39, delete "yields 3,5-di-tert-butyl-4-hydroxyphenyl cetyl(3,5-dicyclohexyl-4-hydroxybenzyl)dithio-carbamate". Column 11, line 43, insert "S" at start of Formula (V). Column 12, line 7, "9 percent" should read -- 99 percent --.

SIGNED AND
SEALED
APR 28 1970

(SEAL)
Attest:

Edward M. Fletcher, Jr.
Attesting Officer

WILLIAM E. SCHUYLER, JR.
Commissioner of Patents